US006869021B2

(12) United States Patent
Foth et al.

(10) Patent No.: US 6,869,021 B2
(45) Date of Patent: *Mar. 22, 2005

(54) METHOD FOR FIELD PROGRAMMING RADIO FREQUENCY IDENTIFICATION LABELS

(75) Inventors: Thomas J. Foth, Trumbull, CT (US); Brian M. Romansky, Monroe, CT (US); Jeffrey D. Pierce, Sandy Hook, CT (US); Anand V. Chhatpar, Madison, WI (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/430,926

(22) Filed: May 7, 2003

(65) Prior Publication Data

US 2004/0074959 A1 Apr. 22, 2004

Related U.S. Application Data

(60) Provisional application No. 60/419,361, filed on Oct. 18, 2002.

(51) Int. Cl.[7] .......................... G60K 19/06; G60K 15/00
(52) U.S. Cl. ...................................... 235/492; 235/383
(58) Field of Search ................................ 235/375, 492, 235/383; 340/10.1, 10.5, 10.51, 10.52; 178/18.01; 307/125

(56) References Cited

U.S. PATENT DOCUMENTS

| | | | | |
|---|---|---|---|---|
| 4,889,961 A | * | 12/1989 | Carlson | ....................... 174/261 |
| 5,962,834 A | | 10/1999 | Markman | |
| 6,018,299 A | * | 1/2000 | Eberhardt | ................ 340/572.7 |
| 6,111,506 A | | 8/2000 | Yap et al. | |
| 6,436,516 B1 | | 8/2002 | Nagashima et al. | |
| 6,480,100 B1 | | 11/2002 | Frieden et al. | |
| 6,557,768 B2 | | 5/2003 | Yap et al. | |
| 6,628,199 B1 | | 9/2003 | Ehrensvärd et al. | |
| 2001/0006194 A1 | | 7/2001 | Kayanakis et al. | |

FOREIGN PATENT DOCUMENTS

| | | |
|---|---|---|
| DE | 19947180 A1 | 4/2001 |
| DE | 20106542 U1 | 7/2001 |
| DE | 10016716 A1 | 8/2001 |
| JP | 02003037522 A | 2/2003 |
| WO | WO 01/91045 A1 | 11/2001 |

\* cited by examiner

*Primary Examiner*—Thien M. Le
*Assistant Examiner*—April A. Taylor
(74) *Attorney, Agent, or Firm*—Ronald Reichman; Angelo N. Chaclas (57) ABSTRACT

A system and method that allows one to mark information with a pencil on a label equipped with a RFID type circuit, and have the marked information provided to the RFID circuit, or have the written information cause the RFID circuit to supply information regarding the goods that are contained in a individual container. Individual containers may be placed in a larger container. The marked entered information may be corrected by erasing the written information with a pencil eraser and writing new information on the paper with a pencil. Information may also be marked into a RFID circuit or have the marked information cause the RFID circuit to perform some function by utilizing a standard ink jet computer printer to print lines on paper equipped with a RFID type circuit, by having the printed lines perform the function of wires. The aforementioned printed information may be modified by having an individual connect different printed wires by drawing a penciled line between the wires or by punching holes in the printed lines.

40 Claims, 7 Drawing Sheets

METHOD FOR FIELD PROGRAMMING RADIO FREQUENCY IDENTIFICATION LABELS

CROSS REFERENCE TO RELATED APPLICATIONS

Reference is made to commonly assigned co-pending patent applications Ser. No. 10/431,066 filed herewith entitled "METHOD FOR FIELD PROGRAMMABLE RADIO FREQUENCY DOCUMENT IDENTIFICATION DEVICES" in the names of Anand V. Chhatpar, Jeffrey D. Pierce, Brian M. Romansky, Thomas J. Foth and Andrei Obrea; Ser. No. 10/430,911 filed herewith entitled "METHOD FOR FIELD PROGRAMMING RADIO FREQUENCY IDENTIFICATION DEVICES THAT CONTROL REMOTE CONTROL DEVICES" in the names of Jeffrey D. Pierce, Brian M. Romansky, Thomas J. Foth and Anand V. Chhatpar; Ser. No. 10/430,925 filed herewith entitled "METHOD FOR FIELD PROGRAMMABLE RADIO FREQUENCY IDENTIFICATION TESTING DEVICES FOR TRANSMITTING USER SELECTED DATA" in the names of Thomas J. Foth, Brian M. Romansky, Jeffrey D. Pierce, Andrei Obrea and Anand V. Chhatpar; Ser. No. 10/430,922 filed herewith entitled "METHOD FOR FIELD PROGRAMMABLE RADIO FREQUENCY IDENTIFICATION DEVICES TO PERFORM SWITCHING FUNCTIONS" in the names of Andrei Obrea, Brian M. Romansky, Thomas J. Foth, Jeffrey D. Pierce and Anand V. Chhatpar; Ser. No. 10/431,067 filed herewith entitled "METHOD FOR FIELD PROGRAMMING RADIO FREQUENCY IDENTIFICATION RETURN FORMS" in the names of Jeffrey D. Pierce, Thomas J. Foth, Brian M. Romansky, Andrei Obrea, and Anand V. Chhatpar; and Ser. No. 10/430,597 filed herewith entitled "METHOD AND APPARATUS FOR FIELD PROGRAMMING RADIO FREQUENCY IDENTIFICATION DEVICES" in the names of Brian M. Romansky, Thomas J. Foth, Jeffrey D. Pierce, Andrei Obrea and Anand V. Chhatpar.

This Application claims the benefit of the filing date of U.S. Provisional Application No. 60/419,361 filed Oct. 18, 2002, which is owned by the assignee of the present Application.

FIELD OF THE INVENTION

This invention pertains to electronic circuits and, more particularly, to programmable radio frequency product labels.

BACKGROUND OF THE INVENTION

Dangerous goods are substances and articles that are potentially hazardous to people and property. They may be corrosive, flammable, explosive, oxidizing or reactive with water, toxic, radioactive, etc. Whatever their properties and their potential for injury and destruction, great care is needed in their handling, storage and transport. Examples of dangerous goods are explosives, gun powder, blasting material, bombs, detonators, smokeless powder, radioactive materials, ammunition, atomic weapons, chemical compounds or any mechanical mixture containing any oxidizing and combustible units, or other ingredients in such proportions, quantities, or packing that ignite by fire, friction, concussion, percussion or detonation of any part thereof which may and is intended to cause an explosion; poisons; carcinogenic materials; caustic chemicals; hallucinogenic substances; illegal materials; drugs that are illegal to sell and/or dispense; and substances which, because of their toxicity, magnification or concentration within biological chains, present a threat to biological life when exposed to the environment, etc. All other types of goods may be considered normal goods.

The government has promulgated regulations regarding the storage, handling and shipment of dangerous goods. These Regulations are designed to prevent accidents, provide safety standards to protect workers, the community and the environment from the effects of fires, explosions and escapes of these dangerous goods.

Dangerous goods and normal goods may be shipped and stored in individual containers that may be placed in larger containers. The contents and descriptions of the goods and information pertaining to the goods in the individual containers and the contents and descriptions of the goods and information pertaining to the goods in the larger containers may be written directly on the containers and/or labels that are attached to the containers. One of the problems of the prior art was that the only way to determine the information written on the individual containers that are placed in larger containers was to remove the individual containers from the larger containers. The foregoing process is labor intensive, time consuming and expensive.

Another problem experienced by the prior art was that the information written on the containers and/or labels had to be directly scanned by optical scanners or directly viewed by humans in order to be read. An additional problem encountered by the prior art was that if many individual containers having goods were placed in a larger sealed container, someone may remove, i.e., steal some of the individual containers from the larger container and reseal the larger container without the custodian of the larger container realizing that some individual containers are missing.

Another problem of the prior art is that someone may remove an individual container from a larger sealed container and replace the removed container with a different container and then reseal the larger container without the custodian of the larger container realizing the change. This may result in a theft or dangerous goods being substituted for normal goods.

The information written on the containers and/or the information written on the labels that are attached to the containers may be written on paper and then entered into a computer. Typically, the information written on paper and/or labels is entered into computers by optically scanning the paper and/or labels. The foregoing method of entering information into computers is inconvenient, because the paper and/or label must be placed directly on the scanner, and no intervening objects may be placed between the paper and the scanner. Another method utilized by the prior art for writing information on paper and/or labels and entering the written information into a computer involved placing a piece of paper over an expensive digitizing pad and using a special pen that produced digital data by indicating the coordinates of the digitizing pad. Thus, heretofore, there was no economic, convenient way for wirelessly entering information written on plain paper, labels, and/or on containers into a computer.

Another method utilized by the prior art for entering information into a computer involved the use of radio frequency identification (RFID) tags. The RFID tags were programmed to contain digital information either during the manufacturing of the read only memory portion of the RFID integrated circuit, or in the field using electromagnetic radio frequency signals to store information in the nonvolatile memory portion of the RFID tag. One of the difficulties involved in the utilization of RFID tags was that if an end user wanted to enter information into the RFID tag, the end user had to use a specialized device that communicated with the RFID tag through a radio frequency. Another problem involved in the utilization of RFID tags that were programmed by the manufacturer was that the end user had to share the information that was going to be programmed into the RFID tag with the manufacturer of the tag.

SUMMARY OF THE INVENTION

This invention overcomes the disadvantages of the prior art by providing a method that allows one to mark information with a pencil on a material, equipped with a RFID type circuit, and have the marked information provided to the RFID circuit, or have the written information cause the RFID circuit to perform some function. The material may be any cellulose type product, i.e., paper, cardboard, chipboard, wood or plastic, fabric, animal hide, etc. The marked entered information may be corrected by erasing the written information, with an pencil eraser and writing new information on the paper or other material with a pencil. Information may also be marked into a RFID circuit or have the marked information cause the RFID circuit to perform some function by utilizing a standard ink jet computer printer to print lines on paper equipped with a RFID type circuit, by having the printed lines perform the function of wires. The aforementioned printed information may be modified by having an individual connect different printed wires by drawing a penciled line between the wires or by punching holes in the printed lines.

This invention accomplishes the foregoing by utilizing the RFID serial number generation portion of the RFID circuit that is used when the RFID circuit is being read. In the prior art, the bits used to encode one's and zero's into the generation portion of the RFID circuit were typically fixed. This invention utilizes the serial number generation portion of the RFID circuit by exposing on a piece of paper some or all of the bits left open or closed to represent a binary values, i.e., ones or zeros. A user may complete the RFID serial number storage portion of the RFID circuit by filling in the space between the connections with a pencil to alter the binary values. Alternatively, the serial number generation portion of the RFID circuit may be exposed on a piece of paper with all of the connections made, and a user may break a space between the connections with a sharp instrument or hole punch to alter the binary values. Alternatively, the serial number generation portion of the RFID circuit may have some of the bits all ready left open or closed to represent a unique number.

An additional advantage of this invention is that the one may be able to read the information written on individual containers and/or labels that are affixed to individual containers that are placed inside larger containers without opening the larger containers.

A further advantage of this invention is that when individual containers having goods were placed in a larger sealed container, someone will be able to determine that some of the individual containers have been removed from the larger container without opening the larger container.

A further advantage of this invention is that a custodian will be able to detect if someone removes an individual container from a larger sealed container and replaces the removed container with a different container and then reseal the larger container.

DETAILED DESCRIPTION OF THE PREFERRED EMBODIMENT

Figure 1:
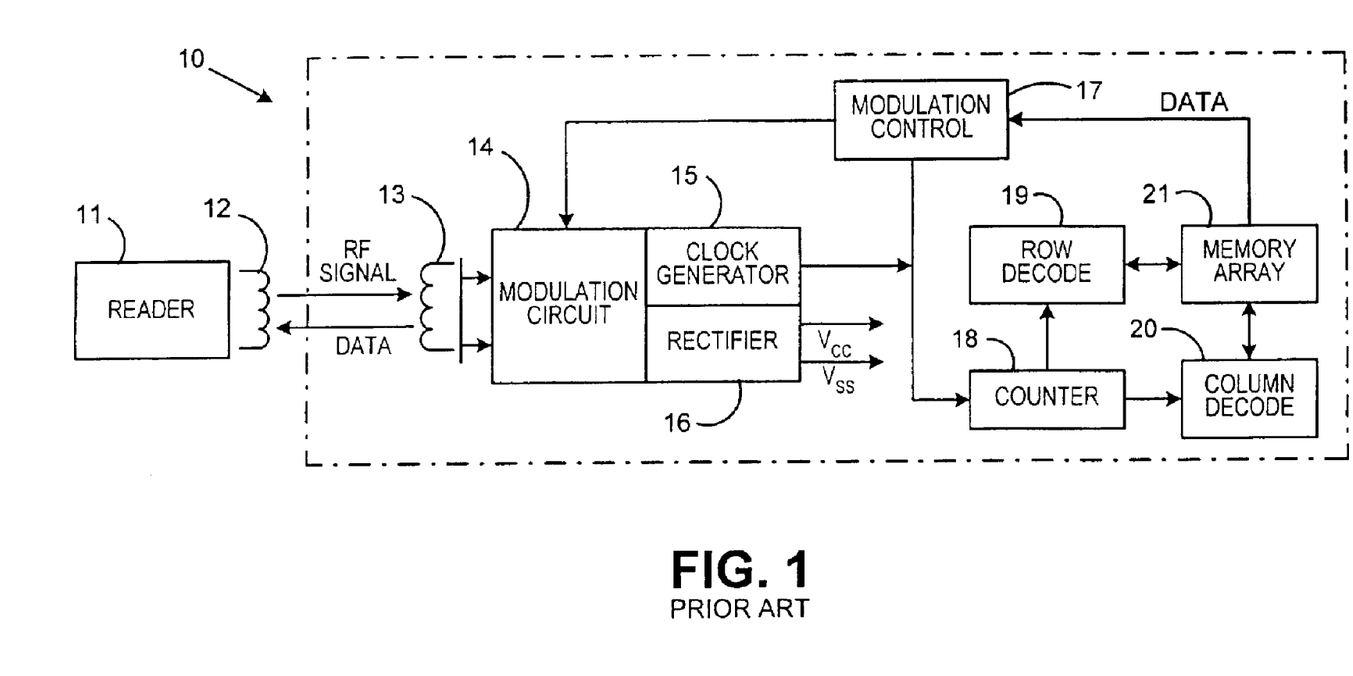
FIG. 1 is a block diagram of a prior art RFID circuit.

Referring now to the drawings in detail, and more particularly to FIG. 1, the reference character 10 represents a prior art RFID circuit. Circuit 10 may be the model MCRF 200 manufactured by Microchip Technology, Inc. of 2355 West Chandler Blvd, Chandler, Ariz. 85224. RFID reader 11 is connected to coil 12, and 12 is coupled to coil 13. Coil 13 is connected to modulation circuit 14. Modulation circuit 14 is connected to clock generator 15 and rectifier 16. Modulation control 17 is coupled to modulation circuit 14, clock generator 15 and counter 18. Counter 18 is coupled to column decode 20. Row decode 19 is coupled to memory array 21, and array 21 is coupled to modulation control 17. It would be obvious to one skilled in the art that a battery may be used to supply power to circuit 10.

Reader 11 has a transmitter mode and a receiver mode. During the transmit mode of reader 11, reader 11 transmits a radio frequency signal for a burst of time via coil 12. After the transmission of a signal by reader 11, reader 11 turns into a receiver. Coil 12 is inductively linked with coil 13, and coil 13 receives the radio frequency signal from coil 12 and converts the aforementioned signal into inductive energy, i.e., electricity. When coil 13 has sufficient energy, coil 13 will cause clock generator 15 to generate timing pulses which drive counter 18. Counter 18 drives row decode 19 which causes memory array 21 to read the fixed bit data pattern stored in memory array 21 one bit at a time. As the data bits are being read by array 21, the data bits are transmitted to modulation control circuit 17. Control circuit 17 sends the data bits to reader 11 via modulation circuit 14 and coils 13 and 12.

Figure 2A:
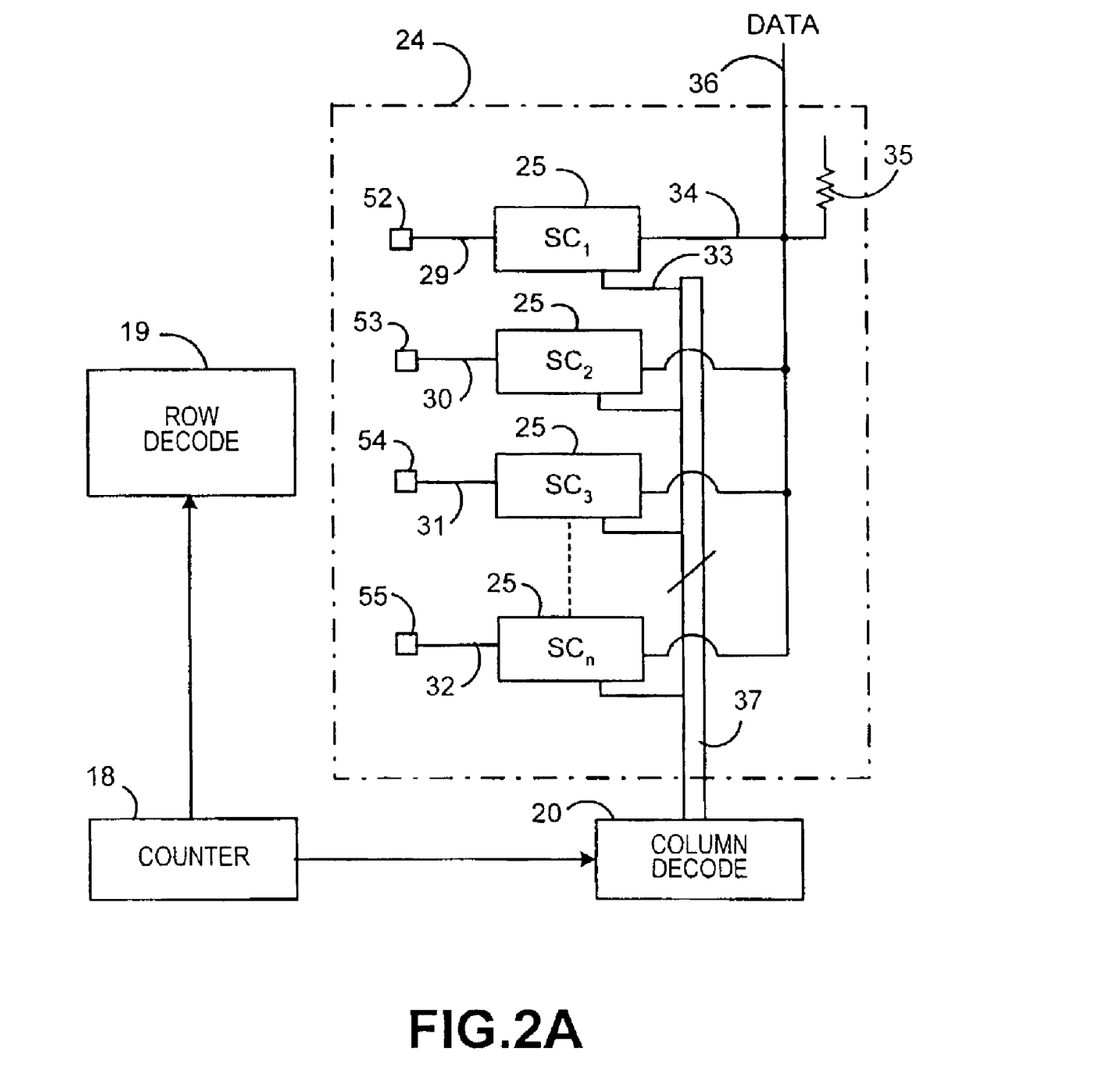
FIG. 2A is a drawing of a circuit 24 that replaces memory array 21 of FIG. 1 showing how programming of the bits may be accomplished by making the bits externally available for programming RFID circuit 10.

FIG. 2A is a drawing of a circuit 24 that replaces memory array 21 of FIG. 1 showing how programming of the bits may be accomplished by making the bits externally available for programming RFID circuit 10. A plurality of sensor circuits 25 is contained in circuit 24. Sensor circuits 25 are labeled $SC_1$ $SC_2$ $SC_3$ ... $SC_n$. Line 29 is connected to $SC_1$ and graphite contact 52 and line 30 is connected to $SC_2$ and graphite contact 53. Line 31 is connected to $SC_3$ and graphite contact 54 and line 32 are connected to $SC_n$ and graphite contact 55. There is a sensor circuit 25 for each graphite contact. The description of FIG. 4 will describe how information may be entered into circuit 24 via graphite contacts 52–55. $SC_1$ has an input 33, which enables the data output 34. Input 33 is connected to one of the n lines 37, and data output 34 is connected to data line 36 and pull up resistor 35. Data line 36 is connected to modulation control 17 (FIG. 1).

When counter 18 selects the value 1, column decode 20 will enable line 33, which will cause the same logic level that is on graphite contact 52 to be placed on data output 34. When line 33 is not selected, the value on graphite contact 52 does not have any influence on the data output line 34. Enable outputs 33 for $SC_1 \ldots SC_n$ are bundled together in lines 37 so that only one line 37 is turned on at a time. Lines 37 are connected to column decode 20. Column decode 20 is connected to counter 18, and counter 18 is connected to row decode 19. Counter 18 generates a sequence of numbers from 1 through n to enable a different line 37 in sequential order. Thus, data line 36 will receive the data outputs 34 from $SC_1 \ldots SC_n$ at different times.

Figure 2B:
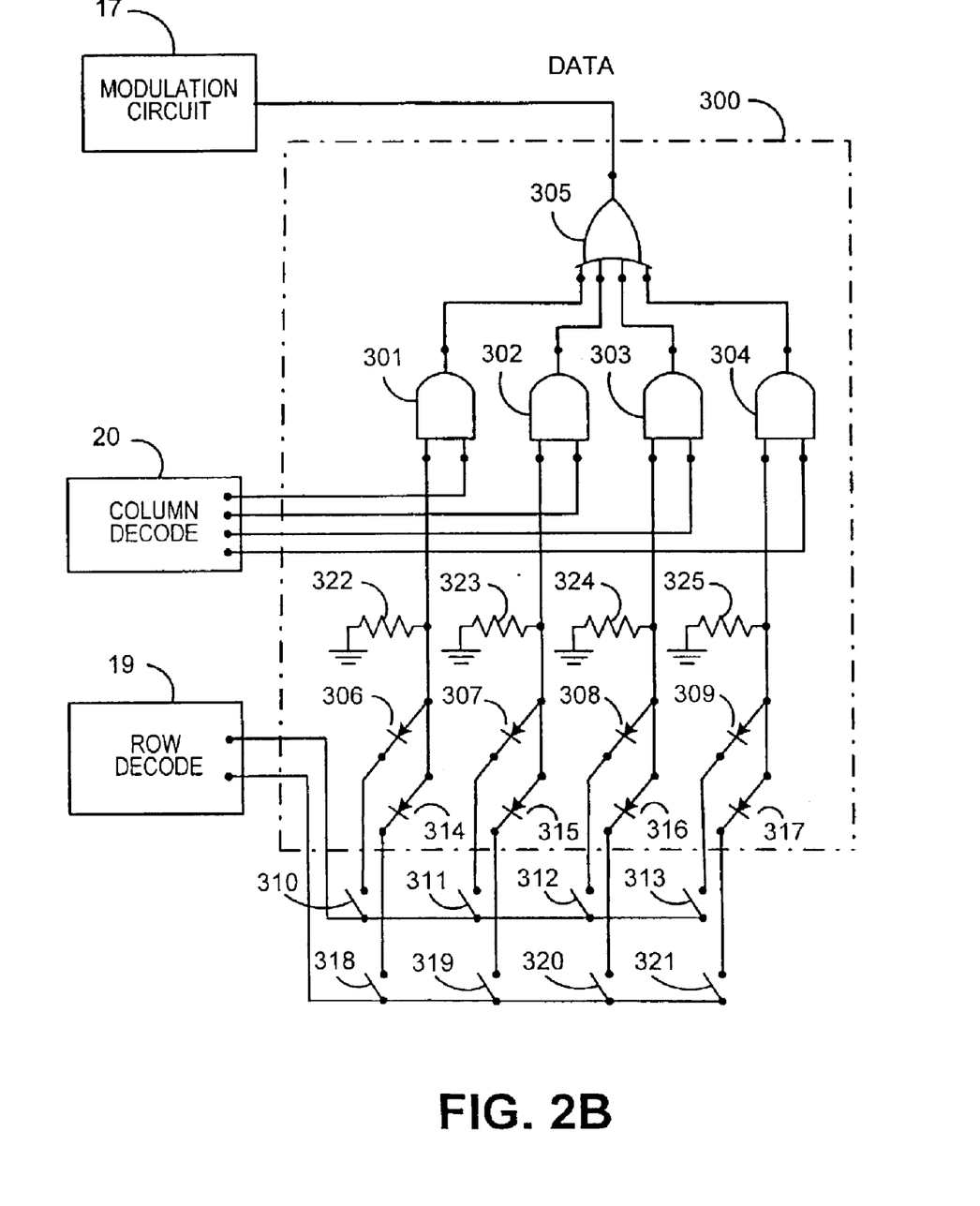
FIG. 2B is a drawing of a circuit 300 that is an alternate representation of circuit 24, that replaces memory array 21 of FIG. 1 showing how programming of the bits may be accomplished by making the bits externally available for programming RFID circuit 10.

FIG. 2B is a drawing of a circuit 300 that is an alternate representation of circuit 24, that replaces memory array 21 of FIG. 1 showing how programming of the bits may be accomplished by making the bits externally available for programming RFID circuit 10. Circuit 300 includes AND gates 301, 302, 303 and 304 and OR gate 305.

One of the inputs of AND gate 301 is connected to column decode 20 and the other input to AND gate 301 is connected to one of the ends of resistor 322, one of the ends of diode 306 and one of the ends of diode 314. The other end of resistor 322 is connected to ground. The other end of diode 306 is connected to one of the terminals of toggle switch 310, and the other end of toggle switch 310 is connected to row decode 19. The other end of diode 314 is connected to one of the terminals of toggle switch 318, and the other end of toggle switch 318 is connected to row decode 19.

One of the inputs of AND gate 302 is connected to column decode 20, and the other input to AND gate 302 is connected to one of the ends of resistor 323, one of the ends of diode 307 and one of the ends of diode 315. The other end of resistor 323 is connected to ground. The other end of diode 307 is connected to one of the terminals of toggle switch 311, and the other end of toggle switch 311 is connected to row decode 19. The other end of diode 315 is connected to one of the terminals of toggle switch 319, and the other end of toggle switch 319 is connected to row decode 19.

One of the inputs of AND gate 303 is connected to column decode 20, and the other input to AND gate 303 is connected to one of the ends of resistor 324, one of the ends of diode 308 and one of the ends of diode 316. The other end of resistor 324 is connected to ground. The other end of diode 308 is connected to one of the terminals of toggle switch 312, and the other end of toggle switch 312 is connected to row decode 19. The other end of diode 316 is connected to one of the terminals of toggle switch 320, and the other end of toggle switch 320 is connected to row decode 19.

One of the inputs of AND gate 304 is connected to column decode 20, and the other input to AND gate 304 is connected to one of the ends of resistor 325, one of the ends of diode 309 and one of the ends of diode 317. The other end of resistor 325 is connected to ground. The other end of diode 309 is connected to one of the terminals of toggle switch 313, and the other end of toggle switch 312 is connected to row decode 19. The other end of diode 317 is connected to one of the terminals of toggle switch 321, and the other end of toggle switch 321 is connected to row decode 19.

Column decode 20 and row decode 19 function by taking the selected output at logic one, i.e., a high level and keeping all the other outputs at logic zero, i.e., a low level. The output of AND gates 301–304 are connected to the input of OR gate 305, and the output of OR gate 305 is data that is connected to the input of modulation circuit 17. If switches 310, 311, 312 and 313, respectively, remain open, AND gates 301–304, respectively, will have a "zero" output. If switches 310, 311, 312 and 313, respectively, are closed, AND gates 301–304, respectively, will have a "one" output. The output of AND gates 301–304, respectively, will be read when switches 318–321, respectively, are closed.

Figure 3:
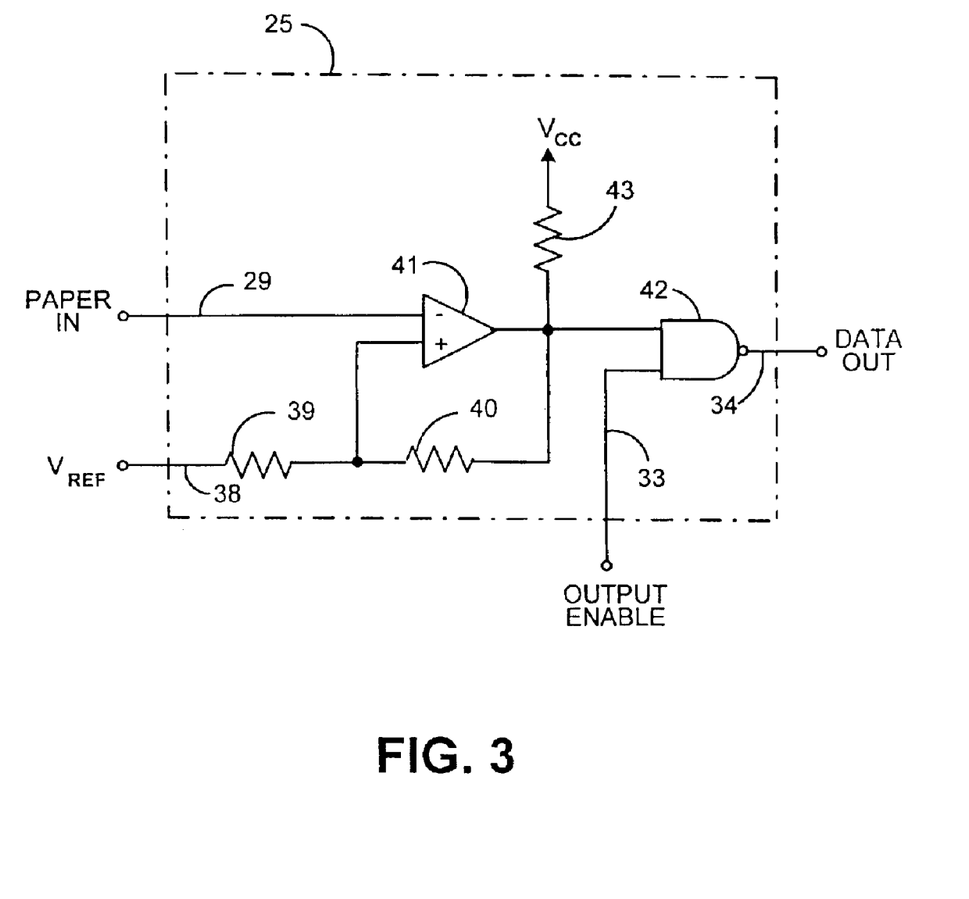
FIG. 3 is a drawing showing sensor circuit 25 of FIG. 2A in greater detail.

FIG. 3 is a drawing showing sensor circuit 25 of FIG. 2A in greater detail. The negative input of comparator 41 is connected to line 29, and the positive input of comparator 41 is connected to line 38. Comparator 41 may be a LM339N comparator. One end of line 38 is connected to a 2–3 volt reference voltage, and the other end of line 38 is connected to one of the ends of resistor 39. The other end of resistor 39 is connected to the positive input of comparator 41 and one of the ends of resistor 40. The other end of resistor 40 is connected to the input of NAND gate 42, the output of comparator 41 and one of the ends of resistor 43. The other end of resistor 43 is connected to a source voltage to act as a pull up resistor. The other input to NAND gate 42 is enable output 33. The output of gate 42 is data output 34. Resistor 39 may be 47,000 ohms, and resistor 40 may be 470,000 ohms. Resistor 43 may be 1,000 ohms. Comparator 41 has a positive feedback to provide a small amount of hysteresis Sensor circuit 25 is a differential circuit that accommodates variations in the conductivity of the conductive material. The conductive material may be used as a voltage divider to produce $V_{ref}$ on line 38 under the same conditions experienced by $paper_{in}$ on line 29. Thereby, nullifying the effects of varying resistance in the conductive material. It will be obvious to one skilled in the art that sensor circuit 25 may replace switches 310–313 and 318–321 of FIG. 2B.

Figure 4:
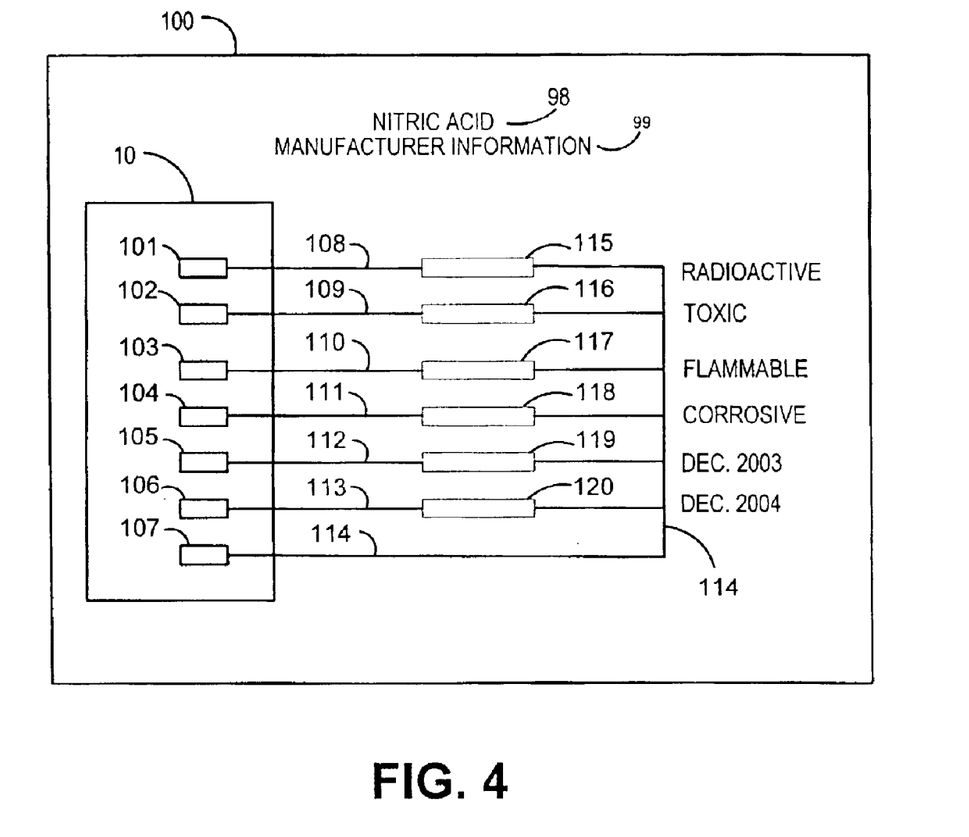
FIG. 4 is a drawing of a label to be completed by a party possessing dangerous goods that is going to be attached to a container.

FIG. 4 is a drawing of a label to be completed by a party possessing dangerous goods that is going to be attached to a container. RFID circuit 10 is attached to material 100 by means of a conductive adhesive such as an anisotropic adhesive (not shown). The manufacturer, shipper and/or custodian of Dangerous goods may place the identity of the goods 98, i.e., nitric acid and manufacturer information and/or other information 99 on material 100 by writing the identity 98 and information 99 on material 100 in a manner that identity 98 and information 99 may be, read by a RFID reader. Graphite contacts 101–107 and lines 108–114 are printed on material 100 with a standard computer printer, like the model Desk Jet 880C printer manufactured by Hewlett Packard using a Hewlett Packard 45 black ink cartridge.

If the custodian of a container having nitric acid to which material 100 is affixed or is going to be affixed decides that the nitric acid is toxic, the custodian uses a graphite pencil, i.e., number 2, HB, etc., or a Paper Mate® black ball point pen to fill in rectangle 116. If the custodian of a container having nitric acid to which material 100 is affixed or is going to be affixed decides that the nitric acid is corrosive, the custodian uses a graphite pencil, i.e., number 2, HB, etc., or a Paper Mate® black ball point pen to fill in rectangle 118. If the custodian of a container having nitric acid to which material 100 is affixed or is going to be affixed decides that the nitric acid loses its potency, expires and/or should only remain in the container until December 2004, the custodian uses a graphite pencil, i.e., number 2, HB, etc., or a Paper Mate® black ball point pen to fill in rectangle 120.

If the custodian of the container having nitric acid decides that the nitric acid is radioactive the custodian fills in rectangle 115 with a graphite pencil. If the nitric is flammable rectangle 117 is filled in with a graphite pencil and if the nitric acid loses its potency, expires and/or should only remain in the container until December 2004 rectangle 120 is filled in with a graphite pencil.

Hence, printed lines 108–114 perform the function of wires so that information may be modified in the RFID type circuit by having an individual connect different printed wires by drawing a penciled line between the wires, i.e., filling in rectangles 115–120 with a graphite pencil or by punching holes in rectangles 115–120 to supply information regarding the dangerous goods.

If the custodian of the container having nitric acid changes his/her mind regarding the classification of the goods or makes a mistake in filling in one of the rectangles, the custodian could erase the penciled marking in the rectangle with a pencil eraser so that a RFID reader would only read what the custodian indicated on material 100. The custodian would affix material 100 to the nitric acid individual container (not shown), and the custodian would be able to read the completed material 100 even if material 100 and its container is placed in a larger container, without opening the larger container.

Figure 5:
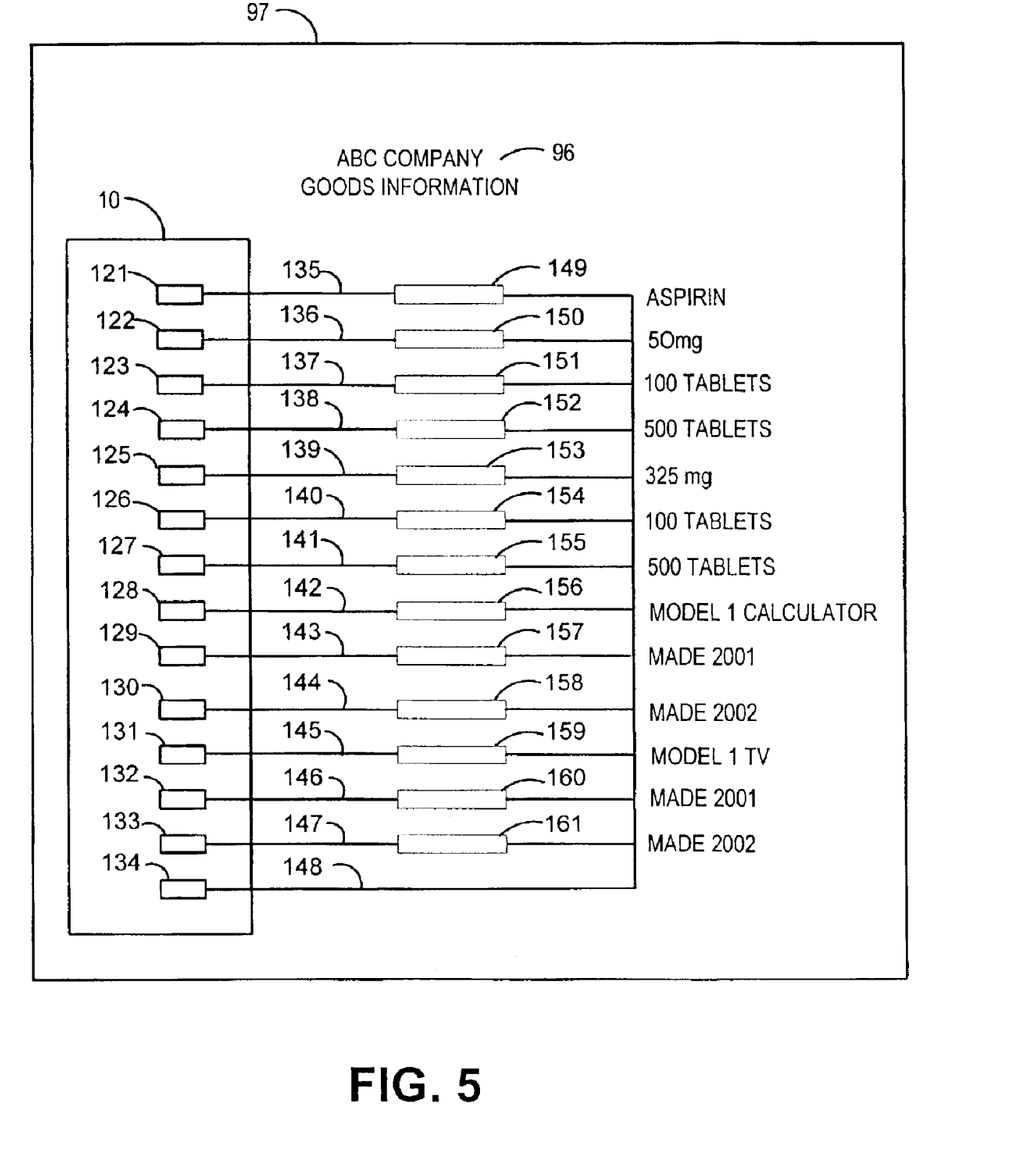
FIG. 5 is a drawing of a label to be completed by a party having custody of goods that is going to be attached to a container.

FIG. 5 is a drawing of a label to be completed by a party having custody of goods that is going to be attached to a container. RFID circuit 10 is attached to material 97 by means of a conductive adhesive such as an anisotropic adhesive (not shown). The manufacturer, shipper and/or custodian of goods, i.e. ABC Company may place the information regarding the goods 96, on material 97 by writing information 96 on material 97 in a manner that information 96 may be, read by a RFID reader. Graphite contacts 121–124 and lines 135–148 are printed on material 97 with a standard computer printer, like the model Desk Jet 880C printer manufactured by Hewlett Packard using a Hewlett Packard 45 black ink cartridge.

If the custodian of a container having goods to which material 97 is affixed or is going to be affixed or is placed in the container containing the goods decides that the goods are containers of 325 mg aspirin that have 500 tablets in each container, the custodian uses a graphite pencil, i.e., number 2, HB, etc., or a Paper Mate® black ball point pen to fill in rectangles 149, 152 and 153.

Hence, printed lines 135–148 perform the function of wires so that information may be modified in the RFID type circuit by having an individual connect different printed wires by drawing a penciled line between the wires, i.e., filling in rectangles 149–161 with a graphite pencil or by punching holes in rectangles 149–161 to supply information regarding the goods.

If the custodian of the container having aspirin changes his/her mind regarding the classification of the goods or makes a mistake in filling in one of the rectangles, the custodian could erase the penciled marking in the rectangle with a pencil eraser so that a RFID reader would only read what the custodian indicated on material 97. For instance, if a model 1 calculated made in 2002 is in the container rectangles 156 and 158 would be filled in with a graphite pencil, i.e., number 2, HB, etc., or a Paper Mate® black ball point pen. The custodian would affix material 97 to the individual container of aspirin (not shown) or place material 97 in the individual containers, and the custodian would be able to read the completed material 97 even if material 97 and its container is placed in a larger container, without opening the larger container. Thus, it will be easier to inventory the goods that are in the containers.

Figure 6:
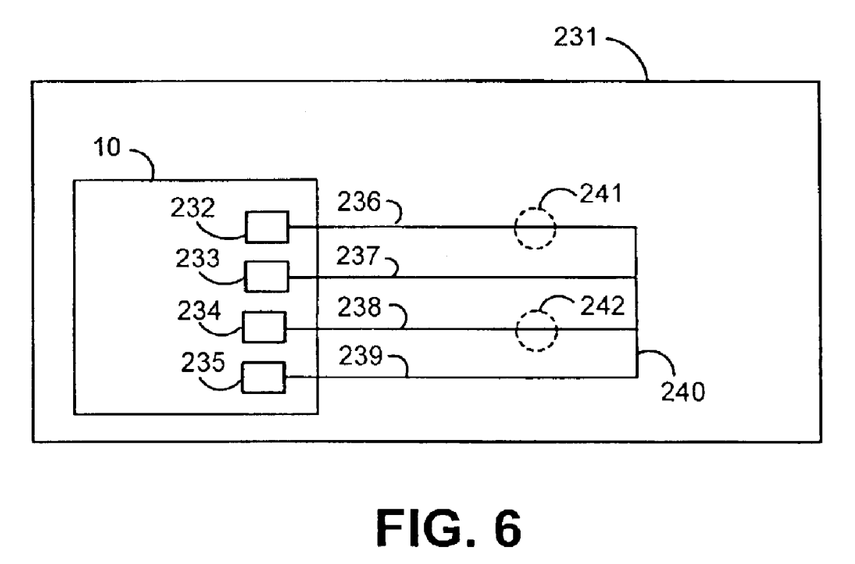
FIG. 6 is a drawing showing how a modified RFID circuit attached to a piece of paper may be altered to indicate a desired selection.

FIG. 6 is a drawing showing how a modified RFID circuit attached to a piece of paper may be altered to indicate a desired selection. RFID circuit 10 is attached to paper 231 by means of an adhesive (not shown). Graphite contacts 232, 233, 234 and 235 and lines 236, 237, 238 and 239 are printed on paper 231 by a standard computer printer like the model Desk Jet 880C printer manufactured by Hewlett Packard using a Hewlett Packard 45 black ink cartridge. If a human user wanted to alter the information represented by line 236 or 238, the user would remove adhesive labels 241 or 242 on lines 236 or 238. A RFID reader (not shown) will be able to read the above selection.

The above specification describes a new and improved label and RFID type circuit that uses printed lines to perform the function of wires so that information may be modified in the RFID type circuit by having an individual connect different printed wires by drawing a penciled line between the wires or by creating openings in the printed lines to supply information regarding the goods. It is realized that the above description may indicate to those skilled in the art additional ways in which the principles of this invention may be used without departing from the spirit. Therefore, it is intended that this invention be limited only by the scope of the appended claims.

What is claimed is:

1. A method for supplying information about goods that are in a container, said method includes the steps of:

A) exposing on a material data bits of a radio frequency identification circuit (RFID) having a number generation portion of the RFID circuit in a manner that the data bits will represent information about the goods, the RFID circuit having a number generation portion that is activated when the RFID circuit is read;

B) altering on the material the data bits of the number generation portion of the RFID circuit in a manner that the altered bits will represent information about the goods; and C) placing the (RFID) circuit in the container or on the outside of the container.

2. The method claimed in claim 1, further including the step of:

placing one or more containers having a RFID circuit in a larger container.

3. The method claimed in claim 1, wherein the goods are dangerous goods.

4. The method claimed in claim 3, wherein step B) further includes the step of:

altering on the material the data bits of the number generation portion of the RFID circuit in a manner that the altered bits will represent physical proprieties of the goods.

5. The method claimed in claim 3, wherein step B) further includes the step of:

altering on the material the data bits of the unique number generation portion of the RFID circuit in a manner that the altered bits will represent when the goods lose their potency.

6. The method claimed in claim 3, wherein step B) further includes the step of:

altering on the material the data bits of the unique number generation portion of the RFID circuit in a manner that the altered bits will represent when the goods should be removed from the container.

7. The method claimed in claim 3, wherein step B) further includes the step of:

altering on the material the data bits of the unique number generation portion of the RFID circuit in a manner that the altered bits will represent when the goods expire.

8. The method claimed in claim 3, wherein step B) further includes the step of:

altering on the material the data bits of the unique number generation portion of the RFID circuit in a manner that the altered bits will represent how the goods shall be handled.

9. The method claimed in claim 1, wherein the altering step further includes the steps of:

marking information on the material with a pencil to alter the bits.

10. The method claimed in claim 9, wherein the pencil is a graphite pencil.

11. The method claimed in claim 9, wherein the marked information performs the function of wires.

12. The method claimed in claim 9, further including the step of:

erasing the marked information to modify the information.

13. The method claimed in claim 9, further including the step of:

punching holes in the marked information to modify the information.

14. The method claimed in claim 9, further including the step of:

removing one or more labels in the marked information to modify the information.

15. The method claimed in claim 1, wherein the recording step further includes the step of:

marking information on the material with a ink jet printer to alter the bits.

16. The method claimed in claim 15, wherein the marked information performs the function of wires.

17. The method claimed in claim 16, further including the step of:

erasing the marked information to modify the information.

18. The method claimed in claim 16, further including the step of:

punching holes in the wires to modify the information.

19. The method claimed in claim 16, further including the step of:

removing one or more labels in the marked information to modify the information.

20. The method claimed in claim 1, wherein the recording step further includes the step of:

marking information on the material with a laser printer to alter the bits.

21. The method claimed in claim 1, wherein the material is paper.

22. The method claimed in claim 1, wherein the material is plastic.

23. The method claimed in claim 1, wherein the goods are dangerous goods.

24. The method claimed in claim 1, wherein the goods are normal goods.

25. The method claimed in claim 1, further including the step of:

placing one or more containers having a RFID circuit in a larger container.

26. The method claimed in claim 25, wherein step B) further includes the step of:

altering on the material the data bits of the number generation portion of the RFID circuit in a manner that the altered bits will represent physical proprieties of the goods.

27. The method claimed in claim 25, wherein step B) further includes the step of:

altering on the material the data bits of the number generation portion of the RFID circuit in a manner that the altered bits will represent when the goods were manufactured.

28. The method claimed in claim 25, wherein step B) further includes the step of:

altering on the material the data bits of the number generation portion of the RFID circuit in a manner that the altered bits will represent characteristics of the goods.

29. The method claimed in claim 25, wherein step B) further includes the step of:

altering on the material the data bits of the number generation portion of the RFID circuit in a manner that the altered bits will represent when the goods expire.

30. The method claimed in claim 25, wherein the altering step further includes the steps of:

marking information on the material with a pencil to alter the bits.

31. The method claimed in claim 30, wherein the pencil is a graphite pencil.

32. The method claimed in claim 30, wherein the marked information performs the function of wires.

33. The method claimed in claim 30, further including the step of:

erasing the marked information to modify the information.

34. The method claimed in claim 30, further including the step of:

punching holes in the marked information to modify the information.

35. The method claimed in claim 25, wherein the recording step further includes the steps of:

marking information on the material with a ink jet printer to alter the bits.

36. The method claimed in claim 35, wherein the marked information performs the function of wires.

37. The method claimed in claim 35, further including the step of:

erasing the marked information to modify the information.

38. The method claimed in claim 35, further including the step of:

punching holes in the marked information to modify the information.

39. The method claimed in claim 1, wherein the number generation portion of the RFID circuit contains a unique identification.

40. The method claimed in claim 1, wherein the RFID number generation portion of the RFID circuit can be set to a unique identification by exposing data bits of the RFID circuit.

* * * * *